United States Patent [19]

Mackal

[11] Patent Number: 5,421,075

[45] Date of Patent: Jun. 6, 1995

[54] METHOD FOR INTERCONNECTING A HANDLE AND A LEVER ARM

[76] Inventor: Glenn H. Mackal, 2586 25th Ave. North, St. Petersburg, Fla. 33713

[21] Appl. No.: 260,931

[22] Filed: Jun. 16, 1994

Related U.S. Application Data

[62] Division of Ser. No. 24,578, Mar. 1, 1993, Pat. No. 5,347,685.

[51] Int. Cl.⁶ ............................................... B23P 11/00
[52] U.S. Cl. ........................................ 29/432; 29/461; 24/136 R
[58] Field of Search .................. 29/432, 432.1, 461, 29/433, 525.1; 24/115 M, 136 L, 136 R; 441/92, 93, 94; 222/5; 16/110 R, 114 B, DIG. 24, DIG. 25

[56] References Cited

U.S. PATENT DOCUMENTS

| | | | |
|---|---|---|---|
| 3,486,684 | 12/1969 | Dills et al. | 16/114 B |
| 4,791,702 | 12/1988 | McVey | 16/114 B |
| 4,815,174 | 3/1989 | Sou | 24/136 R |
| 4,967,824 | 11/1990 | Colson et al. | 24/136 R |

Primary Examiner—Mark Rosenbaum
Assistant Examiner—David P. Bryant
Attorney, Agent, or Firm—Joseph C. Mason, Jr.; Ronald E. Smith

[57] ABSTRACT

A method and apparatus for interconnecting with a lanyard a handle and lever arm of the type used in rapid inflation applications includes apparatus for impaling a first end of a lanyard with multiple spikes to secure the first end to a handle and further includes apparatus for sandwiching the second end of the lanyard between a plug and a bore formed in the lever arm. The lanyard handle is made with a channel having spike-receiving cavities along its extent, and the spikes on a spike-carrying strip impale the first end of the lanyard when the strip is press fit into the channel. At the opposite end of the lanyard, the bore and plug are frusto-conical in configuration so that pulling on the lanyard exerts a wedging action between the plug and bore to tighten the grip on the second end of the lanyard.

1 Claim, 2 Drawing Sheets

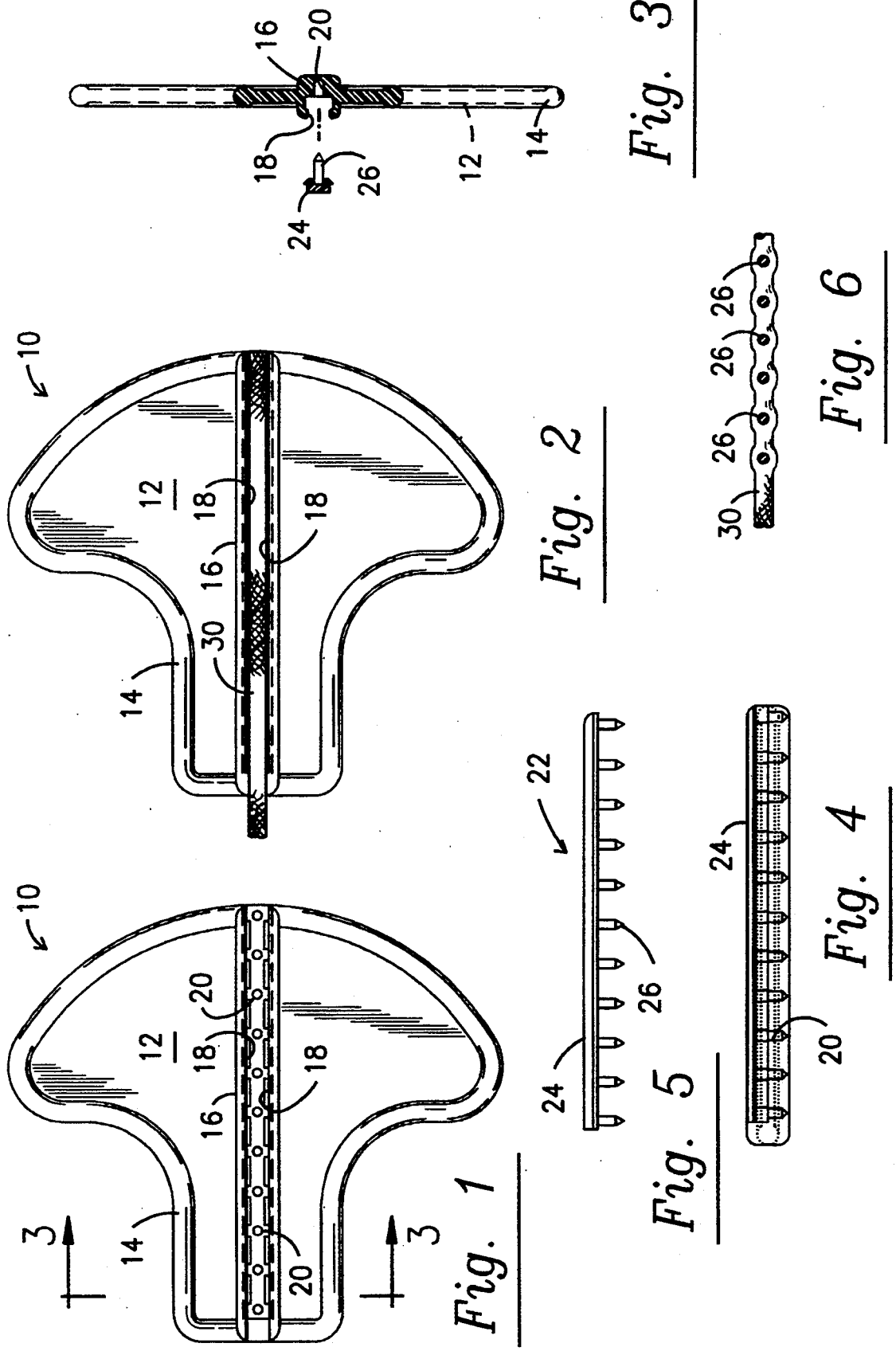

METHOD FOR INTERCONNECTING A HANDLE AND A LEVER ARM

This is a divisional Ser. No. 08/024,578 filed on Mar. 1, 1993; now U.S. Pat. No. 5,347,685.

BACKGROUND OF THE INVENTION

1. Field of the Invention

This invention relates, generally, to apparatus and methods for attaching lanyards in interconnecting relation between preselected articles of manufacture. More particularly, it relates to apparatus and methods for interconnecting with a lanyard a handle and lever arm of the type used in rapid inflation equipment.

2. Description of the Prior Art

Life preservers and other flotation devices that require rapid inflation typically rely on the quick release of compressed carbon dioxide into the article to be inflated. In many devices, a user of the equipment pulls on a handle to effect the inflation. Typically, a lanyard interconnects the handle and a pivotally mounted lever arm so that the lever arm pivots when the handle is pulled. The pivoting of the lever arm drives a pin through a membrane in a carbon dioxide cartridge, thereby releasing said gas into the inflatable article.

Obviously, if the lanyard separates from either the handle or the lever arm when the handle is pulled, the lever arm will not pivot and the article will not be inflated. Thus, inventors have devised several methods of attachment to ensure that the opposite ends of the lanyard will remain connected to the handle and lever arm, respectively, when the former is pulled.

The most effective apparatus and method heretofore developed for securing a lanyard to a handle is shown in U.S. Pat. No. 5,099,546 to the present inventor, entitled "Lanyard-Gripping Handle," and the most effective method and apparatus for securing a lanyard to a lever arm is shown in U.S. Pat. No. 5,042,134 to the present inventor, entitled "Method For Securing A Lanyard To An Inflator Lever Arm." In the lanyard-to-handle method, a first end of the lanyard is positioned in sandwiched relation between two mold parts for making the handle, and said first end is forced to follow a serpentine path of travel by a plurality of plugs placed along the extent of the mold. Thus, when the molding process is completed and the plugs removed, the lanyard is molded between the lanyard halves in a serpentine configuration so that it can not be pulled therefrom. A similar process is followed at the lever arm end of the assembly. That technique is very effective, but it is capital-intensive because the molds are large and expensive. What is needed, then, is a method that would be more labor-intensive so that the cost of molds and the size of the molding machine could be reduced. However, the prior art, when considered as a whole, neither taught nor suggested to those of ordinary skill in this art at the time the present invention was made, how the needed method could be provided.

SUMMARY OF THE INVENTION

A channel is formed coincident with the longitudinal axis of symmetry of a lanyard handle and a plurality of longitudinally spaced apart spike-receiving cavities are formed in the bottom of said channel. A separate spike-carrying strip carries spikes that enter their associated cavities when the strip is positioned in the channel. To secure a first end of a lanyard to the handle, the lanyard is manually positioned in the channel, and the strip is driven into the channel in overlying relation to the lanyard so that the spikes carried by said spike-carrying strip are driven through the lanyard, impaling it, and into their respective cavities.

The lever arm to which the second end of the lanyard is attached is bored to receive said opposite end therein. The bore is enlarged near the pivotally secured end of the lever arm, and a plurality of teeth are formed in the interior walls of said bore. A plug that mates with that bore has mating teeth formed in its outer surface, and the second end of the lanyard is positioned between the teethed walls of the enlarged bore and the teethed surface of the plug. Thus, when the plug is driven into the enlarged bore, said second end of the lanyard is tightly trapped therebetween.

Thus, it is clear that the primary object of this invention is to advance the art of lanyard attachment by disclosing a new method that does not rely upon expensive molds.

A closely related object is to disclose a lanyard attachment method that is more labor intensive than the known prior art methods.

Another object is to provide a method that secures the opposite ends of the lanyard just as tightly, if not more tightly, than the methods heretofore developed.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a top plan view of the novel lanyard handle of this invention;

FIG. 2 is a top plan view of said handle when a lanyard is positioned in the channel shown in FIG. 1;

FIG. 3 is a sectional view of said handle, taken along line 3—3 in FIG. 1;

FIG. 4 is a side elevational view of said handle;

FIG. 5 is a side elevational view of the novel spike-carrying strip;

FIG. 6 is a top plan view of a lanyard having spikes driven thereinto;

Similar reference numerals refer to similar parts throughout the several views of the drawings.

DETAILED DESCRIPTION OF THE PREFERRED EMBODIMENT

Figure 7:
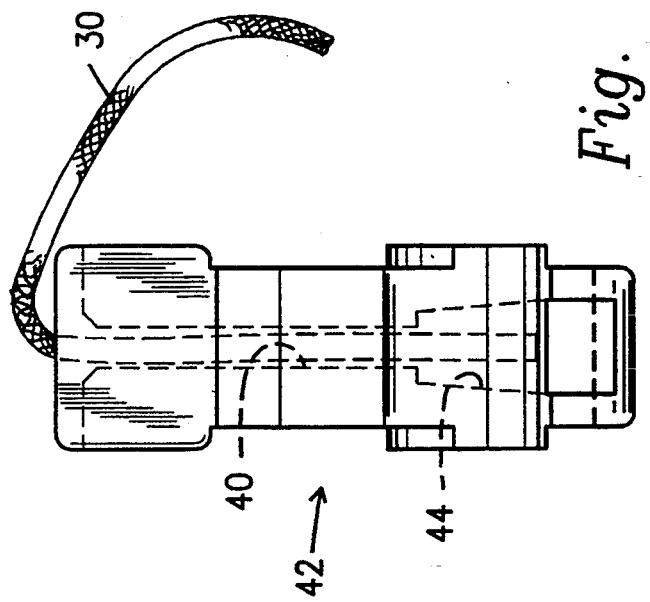
FIG. 7 is a front elevational view of the novel lever arm.

Referring now to FIG. 1, it will there be seen that the novel lanyard handle is denoted as a whole by the reference numeral 10. Handle 10 has a flat main body part denoted 12 that is circumscribed by a bead 14. A central, upraised ridge member 16 is formed along the longitudinal axis of symmetry of handle 10, as perhaps best understood in connection with FIG. 2. Ridge 16 could be obviated by making handle 10 uniformly thick, but the flat main body part 12 is made thin to conserve materials, and that expediency mandates the provision of the ridge. Ridge 16 has an elongate channel 18 of predetermined width formed therein along its length, and equidistantly-spaced spike-receiving cavities 20 are formed along the bottom of said channel in open communication therewith.

FIG. 2 depicts a lanyard 30 positioned in overlying relation to channel 20. Note that the leading end of the lanyard lies flush with the wide leading end of the handle 10. No lanyard extends beyond said leading end as in prior art assemblies; accordingly, lanyard material is not wasted and no time is required to trim off excess lanyard as required by the teachings of the prior art.

A spike-carrying strip 22, shown in FIG. 5, includes an elongate base 22 from which depend, at equidistantly spaced intervals, spikes 26. Spike-carrying strip 22 has about the same predetermined width and extent of channel 18 and is therefor snugly received within said channel 18 when the novel lanyard handle is assembled, and spikes 26 are received within spike-receiving cavities 20 at said time.

Prior to inserting strip 22 into said channel 18, lanyard 30 is placed into overlying relation to said channel, as depicted in FIG. 2. Strip 22 is then placed into alignment therewith, and spikes 26 are driven through lanyard 30 and into cavities 20. The effect this impaling of the lanyard has on it is depicted in FIG. 6; note how the lanyard 30 expands transversely in the vicinity of each spike 26. Since lanyard 30 substantially occupies said channel 18 before the spikes are driven through it, this spreading causes a very tight fit between the sidewalls of the channel 18 and the lanyard, thereby ensuring against retraction of the lanyard. Tests have shown that the force resisting retraction of the lanyard is at least as great as the retraction-resisting force provided by the above-mentioned molded anti-retraction means.

Figure 9:
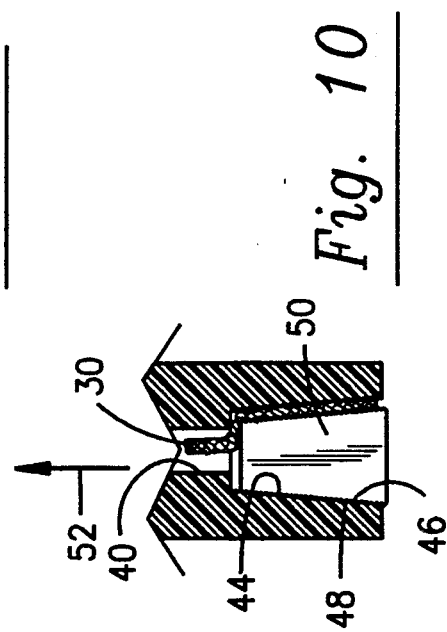
FIG. 9 is a side elevational view of said lever arm.
Figure 8:
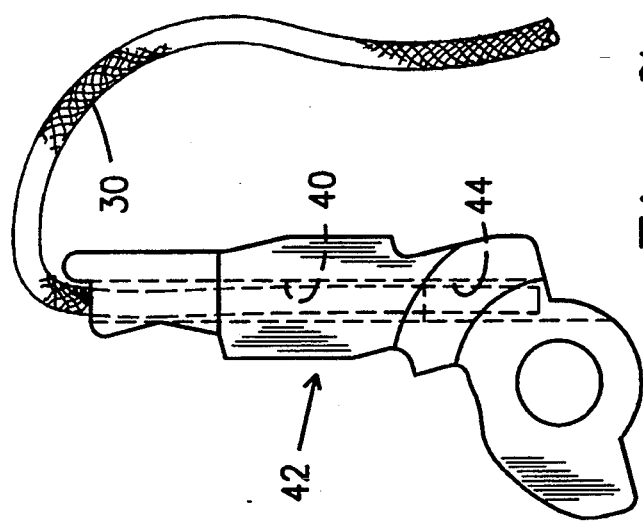
FIG. 8 is a top plan view of said novel lever arm.
Figure 10:
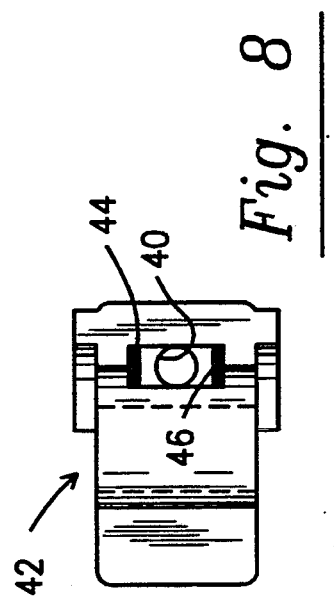
FIG. 10 is a sectional view of the enlarged bore and the plug for retaining the lanyard within said lever arm.

Turning now to FIGS. 7-10, it will there be seen that the opposite end of lanyard 30 is received within elongate, uniform diameter bore 40 formed within lever arm 42. Bore 40 is enlarged as at 44 near the pivotally-secured end of the lever arm. Teeth 46 circumscribe the interior walls of bore 44 and engage complementally formed teeth 48 formed on the external surface of frusto-conical plug 50. As clearly shown in FIG. 10, lanyard 30 is first brought into enlarged bore 44 and positioned near a sidewall thereof so that said bore can accommodate plug 50; when plug 50 is introduced into bore 44, it presses lanyard 30 to one side as shown, thereby tightly capturing it in the manner depicted. Teeth 46 and 48 interlock to ensure against retraction of plug 50 from bore 44. The frusto-conical shape of bore 44 and plug 50 ensure that when lanyard 30 is pulled in the direction indicated by directional arrow 52, plug 50 will be pulled into even tighter relation to bore 44 and the grip on lanyard 30 will strengthen.

In this manner, the opposite ends of lanyard 30 are securely retained within the lanyard handle and lever arm, and the inflation mechanism will not fail as a result of lanyard separation from either of two said parts.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A method for attaching a lanyard to a lanyard handle, comprising the steps of:
    forming a lanyard-receiving channel in a lanyard handle;
    forming a plurality of longitudinally-spaced apart cavities in said lanyard handle along a bottom of said channel;
    inserting a lanyard into said channel, said lanyard overlying said cavities when inserted into said channel; and
    impaling said lanyard with a plurality of spikes along its length by inserting a spike-carrying strip into said channel, said plurality of spikes being at least partially received within respective cavities of said plurality of cavities.

* * * * *